United States Patent
Lavoie

(10) Patent No.: US 10,105,879 B2
(45) Date of Patent: Oct. 23, 2018

(54) METHOD FOR SEALING SURFACES OF A CELLULAR FOAM BODY

(71) Applicant: Gurit (UK) Ltd, Hampshire (GB)

(72) Inventor: Bernard Lavoie, Magog (CA)

(73) Assignee: Gurit (UK) Ltd., St. Cross Business Park Newport, Isle of Wright (GB)

( * ) Notice: Subject to any disclaimer, the term of this patent is extended or adjusted under 35 U.S.C. 154(b) by 0 days.

(21) Appl. No.: 14/773,930

(22) PCT Filed: Mar. 10, 2014

(86) PCT No.: PCT/EP2014/054522
§ 371 (c)(1),
(2) Date: Sep. 9, 2015

(87) PCT Pub. No.: WO2014/139911
PCT Pub. Date: Sep. 18, 2014

(65) Prior Publication Data
US 2016/0016339 A1    Jan. 21, 2016

(30) Foreign Application Priority Data
Mar. 11, 2013 (GB) .................................. 1304319.5

(51) Int. Cl.
*B29C 43/00* (2006.01)
*B29C 44/56* (2006.01)
(Continued)

(52) U.S. Cl.
CPC ............ *B29C 43/003* (2013.01); *B29C 43/10* (2013.01); *B29C 43/52* (2013.01);
(Continued)

(58) Field of Classification Search
CPC .................................................. B29C 43/003
See application file for complete search history.

(56) References Cited

U.S. PATENT DOCUMENTS

| | | | |
|---|---|---|---|
| 3,534,134 A | * | 10/1970 | Mathews ............ B29C 44/5636 264/230 |
| 5,955,511 A | * | 9/1999 | Handa ........................ C08J 9/12 264/50 |
| 2011/0265939 A1 | | 11/2011 | Nakagawa et al. |

FOREIGN PATENT DOCUMENTS

| | | |
|---|---|---|
| DE | 102004006611 A1 | 9/2005 |
| GB | 1272129 | 4/1972 |
| JP | H10 199360 | 7/1998 |

OTHER PUBLICATIONS

Int'l. Search Report and Written Opinion dated Jun. 5, 2014 in PCT/EP2014/054522.

* cited by examiner

*Primary Examiner* — Larry Thrower
(74) *Attorney, Agent, or Firm* — Polsinelli PC; Therese A. Hendricks

(57) ABSTRACT

A method of at least partially sealing surfaces of a body of a cellular foam, preferably comprising polyethylene terephthalate, the cellular foam having an initial compression strength, the method comprising the steps of: providing a body of an cellular foam comprising polyethylene terephthalate, the body having opposite surfaces; disposing the body between first pressure elements; in a first pressure applying step at a first temperature above 100° C., applying a first compression pressure to the opposite surfaces by the first pressure elements, the first compression pressure being less than 10% of the initial compression strength; disposing the pressed body between second pressure elements; and in a second pressure applying step at a second temperature at least 25° C. lower than the first temperature, applying a second compression pressure to the opposite surfaces, the second compression pressure being less than 15% of the initial compression strength.

25 Claims, 5 Drawing Sheets

(51) Int. Cl.
  *B29C 43/10*    (2006.01)
  *B29C 43/52*    (2006.01)
  *B29C 45/02*    (2006.01)
  *B29C 45/14*    (2006.01)
  *B29C 45/17*    (2006.01)
  *B32B 5/18*     (2006.01)
  *B32B 27/06*    (2006.01)
  *B29K 67/00*    (2006.01)
  *B29L 9/00*     (2006.01)
  *B29K 105/04*   (2006.01)

(52) U.S. Cl.
  CPC ...... *B29C 44/5636* (2013.01); *B29C 44/5681* (2013.01); *B29C 45/02* (2013.01); *B29C 45/14795* (2013.01); *B29C 45/1701* (2013.01); *B32B 5/18* (2013.01); *B32B 27/065* (2013.01); *B29K 2067/003* (2013.01); *B29K 2105/04* (2013.01); *B29K 2995/0069* (2013.01); *B29K 2995/0098* (2013.01); *B29L 2009/00* (2013.01); *B32B 2260/021* (2013.01); *B32B 2266/0221* (2013.01); *B32B 2266/0264* (2013.01); *B32B 2266/0271* (2013.01); *B32B 2266/0285* (2013.01); *B32B 2305/022* (2013.01)

METHOD FOR SEALING SURFACES OF A CELLULAR FOAM BODY

FIELD OF THE INVENTION

The present invention relates to a method of at least partially sealing surfaces of a body of an expanded cellular foam, in particular such a body for use as a core of a sandwich panel comprising outer layers of a fibre reinforced matrix resin composite material.

BACKGROUND OF THE INVENTION

It is well known in the art of structural composite materials to employ a sheet of expanded cellular foam as a core of a sandwich panel comprising outer layers of a fibre reinforced matrix resin composite material. The sandwich panel is typically manufactured by disposing respective fibre layers on opposite surfaces of the foam sheet and then infusing a curable resin into the fibre layers and against the opposite surfaces during a vacuum assisted resin transfer moulding step. The resin is then cured to form the sandwich panel.

There is a need to provide a strong adhesive bond between the cured resin layers and the core, so that there is a high peel strength between the cured resin and the core.

There is also a need to minimise the resin take-up of the foam core. This adds undesired weight to the sandwich panel. The opposite surfaces of the cellular foam core tend to have a propensity to take-up the curable resin by absorption of the resin into the opposite surfaces, when the resin is infused against the surfaces during a vacuum assisted resin transfer moulding step.

There is also a need for the foam core of the sandwich panel to exhibit high mechanical properties such as high compressive strength and high shear strength, with uniform mechanical properties over its surface area.

In combination, there is a need for the sandwich panel to exhibit a combination of mechanical properties and low resin uptake.

It is known to treat the surfaces of a foam core by a thermal sealing treatment. For example, US-A-2005/0182239 discloses a process for producing moulded poly(meth)acrylamide foams in which heat and pressure are applied to the foam surface in order to compact the surface. The surface-compacted foam is thereby sealed and can be used as a removable core in fibre-composite components. It is stated that the surface-compacted foam exhibits reduced resin absorption for the same adhesion when used as a core. During the pressing operation, a press is heated to a temperature close to the foaming temperature, the cold foam is inserted into the heated press, the press is closed to apply a contact pressure, stated to be ideally about 30% of the compressive strength of the foam, the heated surfaces of the foam are compressed whereas the cold inner regions of the foam are not compressed and after the desired final thickness is achieved the press and the foam within the press are allowed to cool while the press is closed, the foam only being removed from the press after becoming sufficiently cold to be dimensionally stable after removal. This specification discloses providing a removable core by avoiding adhesion to the core surface, whereas for structural sandwich panels it is generally desired to have a strong adhesive bond, exhibiting high peel strength, between the core and the composite material laminated thereto.

High performance composite sandwich panels have traditionally been constructed from honeycomb materials and structural cellular polymer foams made from polyvinylchloride (PVC) and styrene acrylonitrile (SAN) polymers. The lightweight core mutually spaces apart the structural reinforcements, thereby increasing the flexural rigidity and reducing the overall weight of the structure. Cellular foams are easier to process than honeycomb panels and are the preferred core material when using a vacuum resin infusion process to impregnate structural fibre reinforcements with a resin matrix to form a lightweight sandwich panel.

There is currently a need for structural foams comprised of aromatic polyester, e.g. polyethylene terephthalate (PET), which exhibit a good balance of cost vs. mechanical properties such as compression strength, compression modulus, shear strength and shear modulus to enable the foams to be used as cores in sandwich panels comprising outer layers of a fibre reinforced matrix resin composite material. A drawback of current PET foams vs. other structural cores, such as PVC and SAN, used to form a fibre reinforced sandwich panels, is the increased resin absorption during vacuum infusion and prepreg processing vs. the more expensive structural cores. The increased resin absorption both increases the cost and weight of the final panel.

With an aim to reduce resin take-up by a polyethylene terephthalate (PET) core, the Applicants attempted to apply the sealing process of US-A-2005/0182239, which is limited to poly(meth)acrylamide foams, to polyethylene terephthalate (PET) foams. However, it was found that when the process of US-A-2005/0182239 was used on polyethylene terephthalate (PET) foams, although the resin take-up by the sealed surfaces was reduced, the peel strength between the surface of the core and the resin of the fibre reinforced matrix resin composite material was significantly reduced and fell below a minimum threshold required by a core in a structural sandwich panel. In addition the mechanical properties of the foam were reduced.

Consequently, despite the specific teaching of US-A-2005/0182239, which is limited to poly(meth)acrylamide foams, there is a need in the art for a method for treating polyethylene terephthalate (PET) foams in order to reduce the resin take-up by the foam surfaces when the foam is used as a core, while providing high mechanical properties of the foam and a high peel strength between the surface of the core and resin of a fibre reinforced matrix resin composite material bonded thereto by adhesion between the resin and the foam surface.

SUMMARY OF THE INVENTION

The present invention aims to meet that need. The present invention aims to provide a method for providing polyethylene terephthalate (PET) foams which exhibit low resin take-up by the foam surfaces when the foam is used as a core, while providing high mechanical properties of the foam and a high peel strength between the surface of the core and resin of a fibre reinforced matrix resin composite material bonded thereto by adhesion between the resin and the foam surface.

Accordingly, the present invention provides a method of at least partially sealing surfaces of a body of a cellular foam having an initial compression strength, the method comprising the steps of:
(a) providing a body of a cellular foam comprising polyethylene terephthalate, the body having opposite surfaces;
(b) disposing the body between first pressure elements;
(c) in a first pressure applying step at a first temperature above 100° C., applying a first compression pressure to the opposite surfaces by the first pressure elements, the first compression pressure being less than 10% of the initial compression strength;

(d) disposing the pressed body between second pressure elements; and (e) in a second pressure applying step at a second temperature at least 25° C. lower than the first temperature, applying a second compression pressure to the opposite surfaces, the second compression pressure being less than 15% of the initial compression strength.

Typically, the cellular foam comprises a polyester, preferably an aromatic polyester, such as polyethylene terephthalate.

The first compression pressure and the second compression pressure may be the same or different. In some embodiments, the first compression pressure is from 4 to 9% of the initial compression strength, typically from 5 to 8% of the initial compression strength. In some embodiments, the second compression pressure is from 4 to 15% of the initial compression strength, typically from 6 to 10% of the initial compression strength.

In some embodiments, the body is a sheet having a thickness of up to 150 mm, typically from 15 to 75 mm. In some embodiments, the cellular foam has an initial compression strength of from 0.6 to 4.0 MPa. In some embodiments, the cellular foam has an initial density of from 75 to 200 kg/m$^2$. The cellular foam may be expanded or extruded.

In some embodiments, the second temperature is at least 50° C., or at least 75° C., or at least 100° C., lower than the first temperature. In some embodiments, in the first pressure applying step (c) the first temperature is within 10° C., typically within 5° C., of the heat distortion temperature of the cellular foam. In some embodiments, in the first pressure applying step (c) the first temperature is from 180 to 230° C., typically from 200 to 215° C.

In some embodiments, the first pressure applying step (c) is carried out for a period of from 5 to 120 seconds, typically for a period of from 40 to 80 seconds, optionally about 60 seconds. In some embodiments, in the first pressure applying step (c) the first compression pressure is from 0.05 to 0.3 MPa.

In some embodiments, in second pressure applying step (e) the second temperature is from 15 to 70° C. In some embodiments, the second pressure applying step (e) is carried out until at least the opposite surfaces attain the same temperature as the second temperature. In some embodiments, the second pressure applying step (e) is carried out for a period of at least 30 seconds, optionally at least 60 seconds. In some embodiments, in the second pressure applying step (e) the second compression pressure is from 0.09 to 0.4 MPa.

In some embodiments, the second pressure applying step (e) is commenced no more than 15 seconds, typically no more than 10 seconds, for example no more than 5 seconds, after termination of the first pressure applying step (c).

In some embodiments, prior to step (b) the cellular foam has initial opposite surfaces which are cut surfaces. Preferably, prior to step (b) the cellular foam has initial opposite surfaces which are cut and unsanded surfaces. In some embodiments, prior to step (b) the cellular foam has a substantially uniform cellular structure and/or a cellular structure substantially comprising closed cells.

In some embodiments, the first pressure applying step (c) and the second pressure applying step (e) seal the opposite surfaces to reduce the propensity of the surfaces to take-up a curable resin by absorption of the resin into the opposite surfaces, the resin being infused against the surfaces during a vacuum assisted resin transfer moulding step. Typically, the first pressure applying step (c) and the second pressure applying step (e) reduce the resin take-up of the opposite surfaces by an amount of from 0.6 to 0.8 kg/m$^2$ of both of the opposite surfaces Typically, the first pressure applying step (c) and the second pressure applying step (e) reduce the resin take-up of the opposite surfaces from an unsealed absorption range of from 1.2 to 1.8 kg/m$^2$ of both of the opposite surfaces to a sealed absorption range of from 0.3 to 0.9 kg/m$^2$ of both of the opposite surfaces. Optionally, the resin is an epoxy resin, a polyester resin, a vinyl ester resin, or a phenolic resin.

Preferably the method is for producing a core of a sandwich panel comprising outer layers of a fibre reinforced matrix resin composite material.

The present invention also provides a sandwich panel comprising outer layers of a fibre reinforced matrix resin composite material and a core produced by the method of the invention.

BRIEF DESCRIPTION OF THE DRAWINGS

Embodiments of the present invention will now be described by way of example only, with reference to the accompanying drawings, in which.

DETAILED DESCRIPTION

Figure 1:
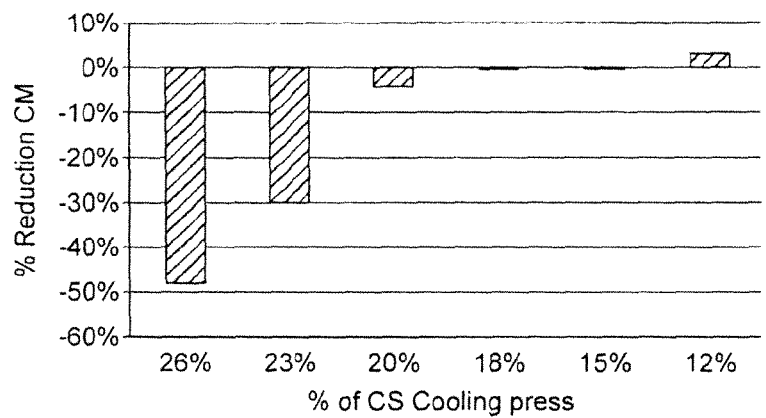
FIGS. 1 to 3 show the relationship between, respectively, the % change in the compression modulus, compression strength and panel resin take-up for a number of samples of sealed foam according to Example 6 of the invention.

The present invention provides a method of at least partially sealing surfaces of a body of a cellular foam preferably comprising polyethylene terephthalate (PET), the cellular foam having an initial compression strength. The PET may be a homopolymer, or alternatively a copolymer with at least one comonomer, such as other ester monomers known in the art to be co-polymerisable therewith.

In the method of the preferred embodiment of the invention, a body of an expanded cellular foam comprising polyethylene terephthalate is provided. Alternatively, the foam may be extruded. Preferably, the expanded cellular foam has a substantially uniform cellular structure and/or a cellular structure substantially comprising closed cells. The expanded cellular foam has an initial compression strength of from 0.6 to 4.0 MPa. The expanded cellular foam has an initial density of from 75 to 200 kg/m$^2$. The body is in the form of a sheet, typically rectangular in plan and with parallel major surfaces, having a thickness of up to 150 mm, typically from 15 to 150 mm, most typically from 15 to 75 mm. The sheet has opposite major surfaces, which are cut surfaces and most preferably are also unsanded surfaces. The cutting may be carried out using a commercial foam slicing machine, for example incorporating a horizontal cutting blade. The cut surface is preferably not subsequently sanded since a sanded surface was found to increase significantly the resin uptake of the foam surfaces following the sealing process as described below.

In the method of the embodiments of the invention, the PET foam is disposed in a first heated press mould for applying a given compression pressure to opposite surfaces of the cut foam sheet at a given temperature for a given time period. The heating temperature is typically approximately the HDT (heat distortion temperature) of the foam. After the heated pressing step, the foam is transferred to a cold press mould for a cool pressing step, typically at a temperature of from 15 to 70° C., for example at room temperature (15 to 30° C.) for applying a given compression pressure to the same opposite surfaces of the cut foam block at room temperature for a given time period. The delay between the heated pressing step and the cool pressing step is typically no more than 5 seconds. The time period of the cool pressing step may be the same as the time period of the previous heated pressing step.

Accordingly, in the embodiments of the invention the foam sheet is disposed between first pressure elements of the heated press mould. Then, in a first pressure applying step at a first temperature above 100° C., a first compression pressure is applied to the opposite surfaces by the first pressure elements, the first compression pressure being less than 10% of the initial compression strength of the foam.

Thereafter, the intermediate pressed body is disposed between second pressure elements of the cool press mould. Then in a second cool pressure applying step at a second temperature at least 25° C. lower than the first temperature, a second compression pressure is applied to the opposite surfaces, the second compression pressure being less than 15% of the initial compression strength. The first compression pressure and the second compression pressure may be the same or different. In some embodiments, the second temperature is at least 50° C., or at least 75° C., or at least 100° C., lower than the first temperature.

Typically, the first heated compression pressure is from 4 to 9% of the initial compression strength, more typically from 5 to 8% of the initial compression strength. Typically, the second cool compression pressure is from 4 to 15% of the initial compression strength, typically from 6 to 10% of the initial compression strength.

In the first heated pressure applying step (c) the first temperature is within 10° C., typically within 5° C., of the heat distortion temperature of the expanded cellular foam. For example, in the heated pressure applying step the temperature is from 180 to 230° C., typically from 200 to 215° C. Typically, the heated pressure applying step (c) is carried out for a period of from 5 to 120 seconds, more typically for a period of from 40 to 80 seconds, for example about 60 seconds. In the heated pressure applying step (c) the heated compression pressure is typically from 0.05 to 0.3 MPa.

In the second cool pressure applying step the temperature is typically from 15 to 30° C. The cool pressure applying step (e) is preferably carried out until at least the opposite surfaces attain the same temperature as the temperature of the cool pressing elements. The cool pressure applying step (e) is typically carried out for a period of at least 30 seconds, optionally at least 60 seconds. In the cool pressure applying step the cool compression pressure is typically from 0.09 to 0.4 MPa.

Preferably, the cool pressure applying step is commenced no more than 15 seconds, typically no more than 10 seconds, for example no more than 5 seconds, after termination of the heated pressure applying step. This substantially provides a quenching effect of the heated surface of the foam surface pressed in the preliminary heated press phase of the method.

In some embodiments, the heated pressure applying step and the subsequent cool pressure applying step seal the opposite surfaces to reduce the propensity of the surfaces to take-up a curable resin by absorption of the resin into the opposite surfaces when the resin is infused against the surfaces during a vacuum assisted resin transfer moulding step. Typically, the first pressure applying step and the second pressure applying step reduce the resin take-up of the opposite surfaces from an unsealed absorption range of from 1.2 to 1.8 kg/m² of both of the opposite surfaces to a sealed absorption range of from 0.3 to 0.9 kg/m² of both of the opposite surfaces. Optionally, the resin is an epoxy resin, a polyester resin or a vinyl ester resin.

The method is particularly suitable for producing a core of a sandwich panel comprising outer layers of a fibre reinforced matrix resin composite material.

The present invention also provides a sandwich panel comprising outer layers of a fibre reinforced matrix resin composite material and a core produced by the method of the invention.

Further aspects of the invention are described with reference to the following non-limiting Examples.

Examples 1 to 5

In each of the Examples a PET foam of a given density was provided. Opposite surfaces of the foam were cut to form a rectangular sheet of foam. The cutting was carried out to achieve the initial surface finish using a commercial foam slicing machine, incorporating a commercially available horizontal cutting blade. The cut surface was not subsequently sanded since a sanded surface was found to increase significantly the resin uptake of the foam surfaces following the sealing process as described below. The sheets had a thickness of from 15 to 150 mm.

The sealing process employed a heated press mould for applying a given compression pressure to opposite surfaces of the cut foam sheet at a given temperature for a given time period. The heating temperature was approximately the HDT (heat distortion temperature) of the foam. The heating time was 60 seconds, in order to be faster than the slicing machine cycle time to simulate an efficient commercial production line. After the heated pressing step, the foam was transferred to a cold press mould for a cool pressing step, at room temperature (15 to 30° C.) for applying a given compression pressure to the same opposite surfaces of the cut foam block at room temperature for a given time period. The delay between the heated pressing step and the cool pressing step was no more than 5 seconds. In the Examples the time period of the cool pressing step was the same as the time period of the previous heated pressing step, both 60 seconds.

In Example 1 the PET foam had a density of about 90 kg/m², in Example 2 the PET foam had a density of about 100 kg/m², in Example 3 the PET foam had a density of about 110 kg/m², in Example 4 the PET foam had a density of about 135 kg/m² and in Example 5 the PET foam had a density of about 200 kg/m²

The initial foam properties and process parameters employed to press and seal the foam samples of Examples 1 to 5 are summarised in Table 1.

TABLE 1

|  | Initial Foam Compression Stength (FCS) MPa | Heat press temp. °C. | Heat press pressure MPa | Heat pressure % of FCS | Cool press pressure MPa | Cool pressure % of FCS |
|---|---|---|---|---|---|---|
| Example 1 | 1.27 | 205 | 0.100 | 7.9% | 0.135 | 10.7% |
| Example 2 | 1.49 | 210 | 0.100 | 6.7% | 0.093 | 6.3% |
| Example 3 | 1.71 | 210 | 0.100 | 5.9% | 0.181 | 10.6% |
| Example 4 | 2.17 | 215 | 0.100 | 4.6% | 0.181 | 8.4% |
| Example 5 | 3.56 | 215 | 0.200 | 5.6% | 0.400 | 11.2% |

In Examples 1 to 5 the resin take-up by the foam panel was determined both before and after the pressing process and the results are shown in Table 2. The resin take-up was measured by simulating a vacuum assisted resin transfer moulding process employing an epoxy resin with the resin being infused against the opposite foam core surfaces. The weight of the resin absorbed by the foam core was measured and calculated to provide a resin weight per unit area of the panel, i.e. the resin taken up by both surfaces of the panel.

TABLE 2

|  | Unsealed panel resin take-up kg/m² | Sealed panel resin take-up kg/m² |
|---|---|---|
| Example 1 | 1.58-1.78 | 0.6-0.8 |
| Example 2 | 1.4-1.6 | 0.6-0.8 |
| Example 3 | 1.4-1.6 | 0.6-0.8 |
| Example 4 | 1.31-1.41 | 0.6-0.8 |
| Example 5 | 1.28-1.30 | 0.6-0.8 |

The Examples 1 to 5 show that employing the heat pressing/cool pressing method of the invention on PET foam sheets of varying density significantly reduced resin take-up by the sealed surfaces of the foam sheet as compared to the initial unsealed surfaces.

Furthermore, the peel strength of the epoxy resin against the foam surfaces was found not to have been reduced for the sealed surfaces as compared to the initial unsealed surfaces.

Still further, the sealing process did not significantly reduce the other mechanical properties of the foam, such as the compressive strength and modulus and the shear strength and modulus.

Example 6

In Example 6 a PET foam of a density of from 113 to 118 kg/m² was provided and was cut to form a plurality of sheets in the manner described above for Examples 1 to 5.

The sealing process employed a heated press mould and a cool press mould in the manner described above for Examples 1 to 5. The heated press mould was at a temperature of 220° C. and applied a compression pressure of 0.1 Mpa, corresponding to 6% of the compression strength of the initial foam which was an average value of 1.71 Mpa. The heat pressing time period was 60 seconds.

In the cool press mould, carried out at room temperature as described above for Examples 1 to 5, various compression pressures were applied on different samples in order to assess the effect of different compression pressures during the cool phase of the cycle. The various cool compression pressures selected were as shown in Table 3.

TABLE 3

|  | Cool press pressure MPa | Cool pressure % of Initial Foam Compression Strength (FCS) |
|---|---|---|
| Sample 1 | 0.45 | 26% |
| Sample 2 | 0.40 | 23% |
| Sample 3 | 0.35 | 20% |
| Sample 4 | 0.30 | 18% |
| Sample 5 | 0.25 | 15% |
| Sample 6 | 0.20 | 12% |

Figure 2:
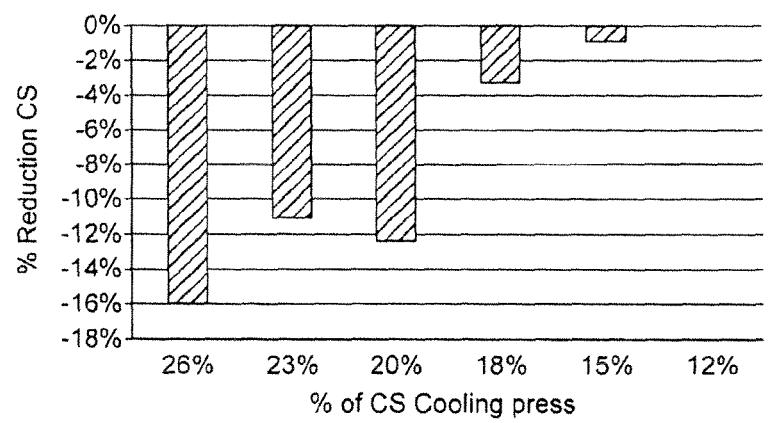
Figure 3:
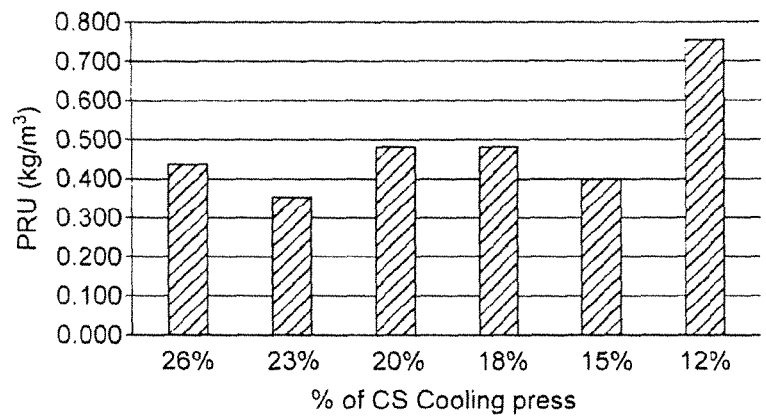

For each of Samples 1 to 6, the % change in the (i) compression modulus, (ii) the compression strength and (iii) the panel resin take-up of the final sealed foam were measured as compared to the corresponding properties of the initial unsealed foam and the results are shown in FIGS. 1 to 3.

FIG. 1 illustrates the % change in the compression modulus and FIG. 2 illustrates the % change in the compression strength. It may be seen cumulatively from these FIGS. 1 and 2 that, using the particular foam density and heat press parameters of this Example, there was only a small reduction, or even a gain, in the compression properties of the final sealed foam if the cool pressure was not greater than about 15% of the compression strength of the unsealed foam.

FIG. 3 illustrates the % change in the panel resin take-up. It may be seen from FIG. 3 that, using the particular foam density and heat press parameters of this Example, there was a generally good reduction in the panel resin take-up properties of the final sealed foam using the various cool pressures, and a greater reduction at the lowest cooling pressure.

Example 7

In Example 6, similar to Example 6, a PET foam of a density of from 90 to 92 kg/m² was provided and was cut to form a plurality of sheets in the manner described above for Examples 1 to 5.

The sealing process employed a heated press mould and a cool press mould in the manner described above for Examples 1 to 5. The heated press mould was at a temperature of 220° C. and applied a compression pressure of 0.1 Mpa, corresponding to 8% of the compression strength of the initial foam which was an average value of 1.27 Mpa. The heat pressing time period was 60 seconds.

In the cool press mould, carried out at room temperature as described above for Examples 1 to 5, various compression pressures were applied on different samples in order to assess the effect of different compression pressures during the cool phase of the cycle. The various cool compression pressures selected were as shown in Table 3.

TABLE 4

|  | Cool press pressure MPa | Cool pressure % of Initial Foam Compression Strength (FCS) |
|---|---|---|
| Sample 7 | 0.2 | 20% |
| Sample 8 | 0.15 | 15% |
| Sample 9 | 0.1 | 10% |

Figure 4:
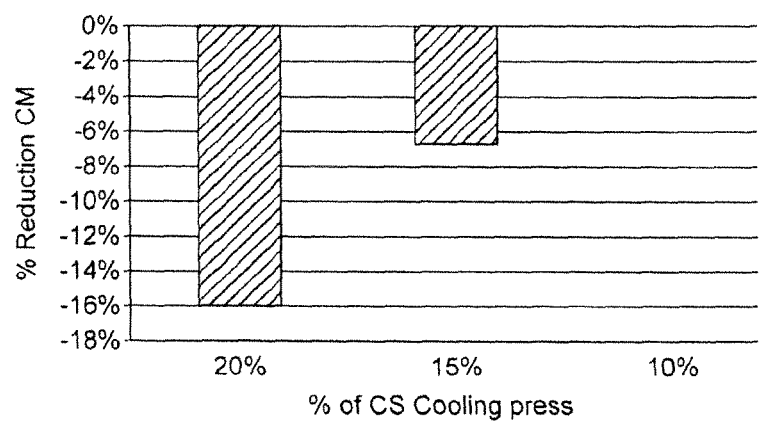
FIGS. 4 to 6 show the relationship between, respectively, the % change in the compression modulus, compression strength and panel resin take-up for a number of samples of sealed foam according to Example 7 of the invention.
Figure 5:
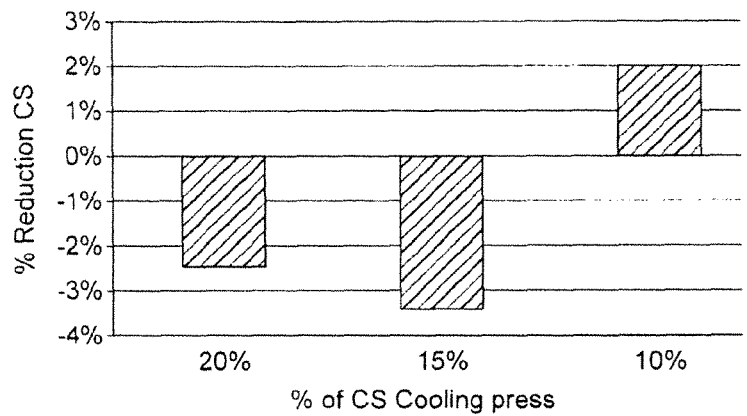
Figure 6:
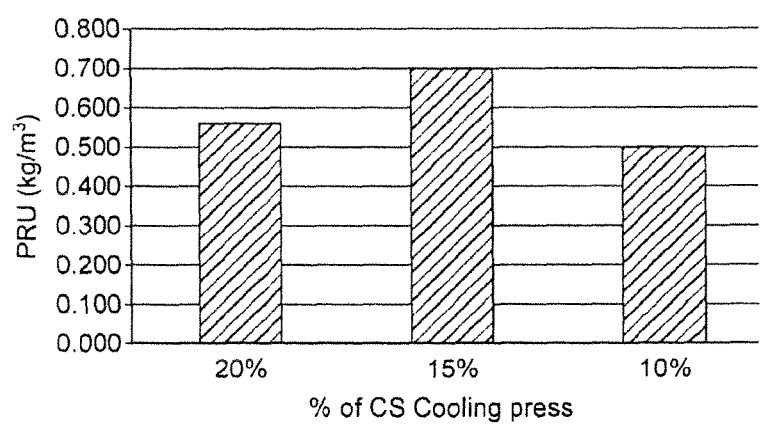

For each of Samples 7 to 9, the % change in the (i) compression modulus, (ii) the compression strength and (iii) the panel resin take-up of the final sealed foam were measured as compared to the corresponding properties of the initial unsealed foam and the results are shown in FIGS. 4 to 6.

FIG. 4 illustrates the % change in the compression modulus and FIG. 5 illustrates the % change in the compression strength. It may be seen cumulatively from these FIGS. 4 and 5 that, using the particular foam density and heat press parameters of this Example, there was only a small reduction, or even a gain, in the compression properties of the final sealed foam if the cool pressure was up to about 15% of the compression strength of the unsealed foam.

FIG. 6 illustrates the % change in the panel resin take-up. It may be seen from FIG. 6 that, using the particular foam density and heat press parameters of this Example, there was a generally good reduction in the panel resin take-up properties of the final sealed foam using the various cool pressures.

Example 8

In Example 8, similar to Example 7, a PET foam of a density of from 90 to 92 kg/m² was provided and was cut to form a plurality of sheets in the manner described above for Examples 1 to 5.

The sealing process employed a heated press mould and a cool press mould in the manner described above for Examples 1 to 5. The heated press mould was at a temperature of 220° C. and applied different compression pressures to different foam samples. Different compression pressures were applied on different samples in order to assess the effect of different compression pressures during the heated phase of the cycle. Sample 10 was subjected to a compression pressure of 0.2 Mpa, corresponding to 16% of the compression strength of the initial foam which was an average value of 1.27 Mpa, whereas Sample 11 was subjected to a compression pressure of 0.1 Mpa, corresponding to 8% of the compression strength of the initial foam. The heat pressing time period was 60 seconds. The various cool compression pressures selected were as shown in Table 5.

TABLE 5

| | Heated press pressure MPa | Heated pressure % of Initial Foam Compression Strength (FCS) |
|---|---|---|
| Sample 10 | 0.2 | 16% |
| Sample 11 | 0.1 | 8% |

In the cool press mould, carried out at room temperature as described above for Examples 1 to 5, Samples 10 and 11 were subjected to the same compression pressure of 0.1 Mpa, corresponding to 8% of the compression strength of the initial foam.

Figure 7:
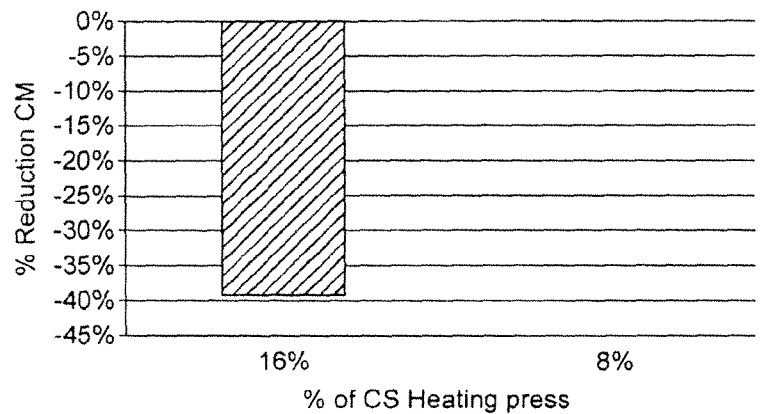
FIGS. 7 to 9 show the relationship between, respectively, the % change in the compression modulus, compression strength and panel resin take-up for a number of samples of sealed foam according to Example 8 of the invention.
Figure 8:
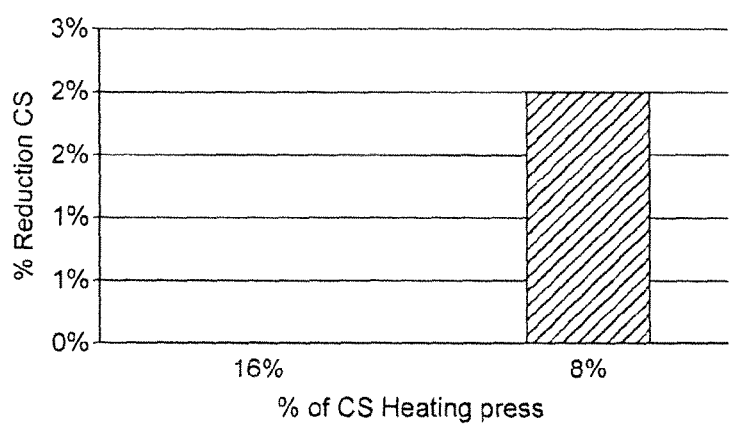
Figure 9:
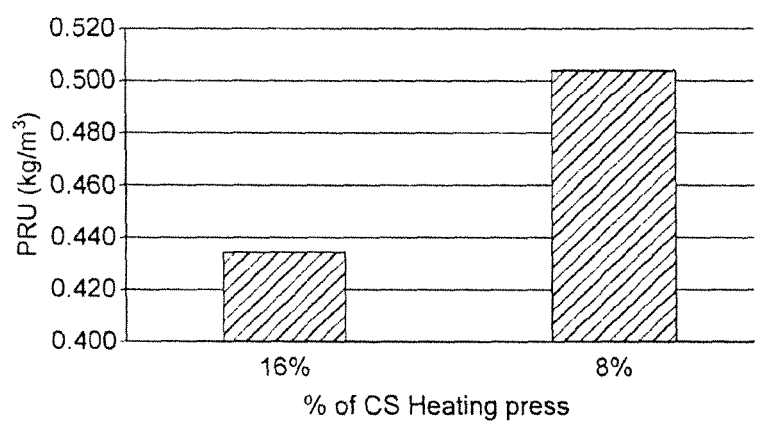

For each of Samples 10 and 11, the % change in the (i) compression modulus, (ii) the compression strength and (iii) the panel resin take-up of the final sealed foam were measured as compared to the corresponding properties of the initial unsealed foam and the results are shown in FIGS. 7 to 9.

FIG. 7 illustrates the % change in the compression modulus and FIG. 8 illustrates the % change in the compression strength. It may be seen cumulatively from these FIGS. 7 and 8 that, using the particular foam density and cool press parameters of this Example, there was only a small reduction, or even a gain, in the compression properties of the final sealed foam if the cool pressure was less than about 10% of the compression strength of the unsealed foam.

FIG. 9 illustrates the % change in the panel resin take-up. It may be seen from FIG. 9 that, using the particular foam density and cool press parameters of this Example, there was a generally good reduction in the panel resin take-up properties of the final sealed foam using the various heated pressures, and a greater reduction at the lower heated pressure.

In summary, the various Examples show that for a range of PET foam densities the combination of good mechanical properties and reduced resin take-up can be achieved when the heated pressure is lower than about 10% of the compression strength of the unsealed foam and subsequent cool pressure is lower than about 15% of the compression strength of the unsealed foam.

Example 9

In Example 9, a PET foam of a density of about 110 kg/m² was provided and was cut to form a plurality of sheets in the manner described above for Examples 1 to 5.

The sealing process employed a heated press mould and a cool press mould in the manner described above for Examples 1 to 5. The heated press mould was at a temperature of 220° C. and applied a compression pressure during the heated phase of the cycle which was from 0.1 to 0.25 Mpa, corresponding to 6 to 15% of the compression strength of the initial foam which was an average value of 1.71 Mpa. The heat pressing time period was from 10 to 120 seconds.

In the cool press mould, carried out at room temperature as described above for Examples 1 to 5, a compression pressure during the cool phase of the cycle was 0.1 to 0.25 Mpa, corresponding to 6 to 15% of the compression strength of the initial foam.

A total of 15 foam samples were treated and each of the resultant sealed foam sheets was tested to determine a relationship between peel strength and panel resin take-up. The average result from the 15 samples was determined and this is designated as Sample 12. The results are shown in Table 6, which also includes corresponding values of these parameters for an unsealed initial foam sample, designated Sample 13, of the same foam, but an unsealed initial foam sample.

TABLE 6

| | Peel strength N | Panel resin take-up kg/m² |
|---|---|---|
| Sample 12 | 310 | 0.645 |
| Sample 13 | 298 | 1.370 |

It may be seen that the sealing process of this embodiment of the invention significantly reduced the resin take-up by the foam panel without significantly decreasing the peel strength of the foam surface, and even the peel strength was increased by the sealing process.

This combination of parameters, low resin take-up and high peel strength, provides the treated sheet with excellent properties required when the foam is to be uses a as a fibre-resin laminate core, and without compromising other mechanical properties, such as the compression and shear properties, of the foam as a result of carrying out the sealing process on the foam.

The invention claimed is:
1. A method of at least partially sealing surfaces of a body of a cellular foam having an initial compression strength, the method comprising the steps of:
    (a) providing a body of a cellular foam comprising polyethylene terephthalate, the body having opposite surfaces, wherein the cellular foam has a cellular structure substantially comprising closed cells;

(b) disposing the body between first pressure elements;

(c) in a first pressure applying step at a first temperature of from 180 to 230° C. which is within 10° C. of the heat distortion temperature of the cellular foam, applying a first compression pressure to the opposite surfaces by the first pressure elements, the first compression pressure being from 4 to 9% of the initial compression strength, wherein the cellular foam has an initial compression strength of from 0.6 to 4.0 MPa and the first compression pressure is from 0.05 to 0.3 MPa;

(d) disposing the pressed body between second pressure elements; and (e) in a second pressure applying step at a second temperature of from 15 to 70° C., applying a second compression pressure to the opposite surfaces, the second compression pressure being from 4 to 15% of the initial compression strength, wherein the first pressure applying step (c) and the second pressure applying step (e) seal the opposite surfaces to reduce the propensity of the surfaces to take-up a curable resin by absorption of the resin into the opposite surfaces, the resin being infused against the surfaces during a vacuum assisted resin transfer moulding step.

2. A method according to claim 1 wherein the first compression pressure and the second compression pressure are the same or different.

3. A method according to claim 1 wherein the first compression pressure is from 5 to 8% of the initial compression strength.

4. A method according to claim 1 wherein the second compression pressure is from 6 to 10% of the initial compression strength.

5. A method according to claim 1 wherein the body is a sheet having a thickness of from 15 to 150 mm.

6. A method according to claim 5 wherein the sheet has a thickness of from 15 to 75 mm.

7. A method according to claim 1 wherein the cellular foam has an initial density of from 75 to 200 kg/m$^3$.

8. A method according to claim 1 wherein in the first pressure applying step (c) the first temperature is within 5° C. of the heat distortion temperature of the expanded cellular foam.

9. A method according to claim 1 wherein in the first pressure applying step (c) the first temperature is from 200 to 215° C.

10. A method according to claim 1 wherein the first pressure applying step (c) is carried out for a period of from 5 to 120 seconds.

11. A method according to claim 10 wherein the first pressure applying step (c) is carried out for a period of from 40 to 80 seconds.

12. A method according to claim 1 wherein in the second pressure applying step (e) the second temperature is from 15 to 70° C.

13. A method according to claim 1 wherein the second pressure applying step (e) is carried out until at least the opposite surfaces attain the same temperature as the second temperature.

14. A method according to claim 1 wherein the second pressure applying step (e) is carried out for a period of at least 30 seconds.

15. A method according to claim 1 wherein in the second pressure applying step (e) the second compression pressure is from 0.09 to 0.4 MPa.

16. A method according to claim 1 wherein the second pressure applying step (e) is commenced no more than 15 seconds after termination of the first pressure applying step (c).

17. A method according to claim 16 wherein the second pressure applying step (e) is commenced no more than 10 seconds after termination of the first pressure applying step (c).

18. A method according to claim 17 wherein the second pressure applying step (e) is commenced no more than 5 seconds after termination of the first pressure applying step (c).

19. A method according to claim 1 wherein prior to step (b) the cellular foam has initial opposite surfaces which are cut surfaces.

20. A method according to claim 19 wherein prior to step (b) the cellular foam has initial opposite surfaces which are cut and unsanded surfaces.

21. A method according to claim 1 wherein prior to step (b) the cellular foam has a substantially uniform cellular structure.

22. A method according to claim 1 wherein prior to step (b) the cellular foam has a cellular structure substantially comprising closed cells.

23. A method according to claim 1 wherein the first pressure applying step (c) and the second pressure applying step (e) reduce the resin take-up of the opposite surfaces by an amount of from 0.6 to 0.8 kg/m$^2$ of both of the opposite surfaces.

24. A method according to claim 1 wherein the first pressure applying step (c) and the second pressure applying step (e) reduce the resin take-up of the opposite surfaces from an unsealed absorption range of from 1.2 to 1.8 kg/m$^2$ of both of the opposite surfaces to a sealed absorption range of from 0.3 to 0.9 kg/m$^2$ of both of the opposite surfaces.

25. A method according to claim 1 wherein the resin is an epoxy resin, a polyester resin, a phenolic resin or a vinyl ester resin.

* * * * *